(12) United States Patent
Sohn et al.

(10) Patent No.: US 11,306,450 B2
(45) Date of Patent: Apr. 19, 2022

(54) ROAD SURFACE PROFILER, ROAD SURFACE PROFILER PERFORMANCE MEASURING INSTRUMENT, AND METHOD FOR ASSESSING PERFORMANCE OF SAME ROAD SURFACE PROFILER BY USING SAME MEASURING INSTRUMENT

(71) Applicant: KOREA EXPRESSWAY CORP., Gimcheon-si (KR)

(72) Inventors: Dueck Su Sohn, Yongin-si (KR); Jae Hoon Lee, Osan-si (KR)

(73) Assignee: KOREA EXPRESSWAY CORP., Gimcheon-si (KR)

( * ) Notice: Subject to any disclaimer, the term of this patent is extended or adjusted under 35 U.S.C. 154(b) by 179 days.

(21) Appl. No.: 16/474,471

(22) PCT Filed: Dec. 28, 2017

(86) PCT No.: PCT/KR2017/015619
§ 371 (c)(1),
(2) Date: Jun. 27, 2019

(87) PCT Pub. No.: WO2018/124759
PCT Pub. Date: Jul. 5, 2018

(65) Prior Publication Data
US 2019/0345678 A1 Nov. 14, 2019

(30) Foreign Application Priority Data
Dec. 28, 2016 (KR) .......... 10-2016-0181241

(51) Int. Cl.
*G01M 17/02* (2006.01)
*G01B 5/28* (2006.01)
(Continued)

(52) U.S. Cl.
CPC .......... *E01C 23/01* (2013.01); *B60W 40/06* (2013.01); *G01B 5/28* (2013.01); *G01D 21/02* (2013.01); *G06F 17/10* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| | | | | |
|---|---|---|---|---|
| 4,422,322 A | * | 12/1983 | Spangler | B60G 17/0165 73/105 |
| 4,456,829 A | * | 6/1984 | Fohey | G01C 7/04 180/169 |

(Continued)

FOREIGN PATENT DOCUMENTS

| | | |
|---|---|---|
| JP | 2006-71372 | 3/2006 |
| KR | 10-2013-0063811 | 6/2013 |

(Continued)

OTHER PUBLICATIONS

International Search Report for International Application No. PCT/KR2017/015619, dated Apr. 5, 2018.

*Primary Examiner* — Andre J Allen
(74) *Attorney, Agent, or Firm* — Kile Park Reed & Houtteman PLLC

(57) ABSTRACT

Provided according to the present invention is a road surface profiler performance measuring instrument, which implements a virtual road surface state in order to assess the performance of a road surface profiler (A) including a distance measurement unit (10) and a flatness measurement unit (20), the measuring instrument comprising: a travel operation unit (100) for augmenting movement distance information (a) generated by the distance measurement unit (10); and a height adjustment unit (200) for changing height (Continued)

information (b) generated by the flatness measurement unit (20).

7 Claims, 8 Drawing Sheets

(51) Int. Cl.
*B60W 40/06* (2012.01)
*E01C 23/01* (2006.01)
*G01D 21/02* (2006.01)
*G06F 17/10* (2006.01)

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | | |
|---|---|---|---|---|
| 4,741,207 | A * | 5/1988 | Spangler | G01B 21/20 33/521 |
| 2003/0110005 | A1* | 6/2003 | Corcoran | G01C 7/04 702/167 |
| 2009/0076722 | A1* | 3/2009 | Darlington | G01S 1/68 701/408 |
| 2012/0203428 | A1* | 8/2012 | Choi | B60G 17/08 701/37 |
| 2013/0289896 | A1* | 10/2013 | Cao | E01C 23/01 702/39 |
| 2016/0325753 | A1* | 11/2016 | Stein | G06K 9/46 |
| 2020/0408897 | A1* | 12/2020 | Westerhoff | G01C 7/04 |

FOREIGN PATENT DOCUMENTS

| | | | |
|---|---|---|---|
| KR | 10-2014-0018682 | 2/2014 | |
| KR | 10-2015-0084432 | 7/2015 | |
| KR | 10-2016-0044659 | 4/2016 | |
| WO | WO-2012100153 A1 * | 7/2012 | ............ E01C 23/01 |

* cited by examiner

ROAD SURFACE PROFILER, ROAD SURFACE PROFILER PERFORMANCE MEASURING INSTRUMENT, AND METHOD FOR ASSESSING PERFORMANCE OF SAME ROAD SURFACE PROFILER BY USING SAME MEASURING INSTRUMENT

CROSS-REFERENCE TO RELATED APPLICATIONS

This U.S. non-provisional patent application claims priority under 35 U.S.C. § 119 of Korean Patent Application No. 10-2016-0181241, filed on Dec. 28, 2016, the entire contents of which are hereby incorporated by reference.

DESCRIPTION

Technical Field

The present invention relates to civil engineering and construction fields, and more particularly, to a road surface profiler performance measuring instrument capable of measuring the performance of a road surface profiler used for profiling the cross-section shape of a road surface and evaluating the flatness of the road surface.

Background Art

As roads are being increasingly extended, interest in the field of road maintenance and repair is increasing, and the road maintenance is developing. In the science of road management, the measurement and survey of road conditions are the basis for repair work and investment decisions.

To select basic data, pavement management systems (PMSs) are used to evaluate paved roads, establish maintenance plans, predict commonality, and select repair methods. At this time, when the data, measured by road pavement measurement equipment, are not correct, the data may cause errors in the PMSs.

The pavement conditions of roads have a great influence on the safety and comfort of traveling vehicles. Indicators for identifying the surface conditions of paved roads include evaluation items such as wheel pitting, step, slip friction, flatness, and crack.

Among the items, flatness is an index for evaluating the degree of unevenness of road surfaces in the transverse direction and is a factor affecting the safety and comfort of traveling vehicles.

Road surface profilers are typical equipment for measuring the flatness of paved roads. Generally, road surface profilers each include a distance measurement unit and a height measurement unit.

The distance measurement unit generates information on the moving distance of a measuring instrument to calculate the distance measured by the profiler, and the height measurement unit generates information on the height of unevenness of road surfaces.

The height information, corresponding to the moving distance information generated by the road surface profiler, is collected to generate profile information of the road surface, and indexes capable of measuring the flatness of the road surface can be produced using the generated profile information.

The road surface profilers come in wide variety of types. However, few profilers can perform accurate profiling. Further, road surface profiler performance measuring instruments capable of measuring the objective performance of road surface profilers are nonexistent.

Thus, it is required to develop a road surface profiler and a road surface profiler performance measuring instrument for measuring the flatness of road surfaces more accurately and objectively.

DISCLOSURE OF THE INVENTION

Technical Problem

The present invention provides a road surface profiler capable of accurately profiling the cross-sectional shape of a road surface.

The present invention also provides a road surface profiler performance measuring instrument capable of measuring the objective performance of a road surface profiler.

The present invention also provides a method capable of measuring the objective performance of a road surface profiler.

Technical Solution

In accordance with an embodiment of the present invention, a road surface profiler performance measuring instrument for implementing a virtual road condition to assess the performance of a road surface profiler (A) including a distance measurement unit (10) and a flatness measurement unit (20) includes: a travelling unit (100) configured to increase moving distance information (a) generated by the distance measurement unit (10); and a height adjustment unit (200) configured to change height information (b) generated by the flatness measurement unit (20).

The road surface profiler performance measuring instrument may further include a control unit (300) configured to control the travelling unit (100) and the height adjustment unit (200).

The distance measurement unit (10) may be a circular wheel (11), and the travelling unit (100) may include: a conveyor belt (110) on which the circular wheel is mounted; and a rotary drum (120) configured to move the conveyor belt (110).

The circular wheel (11) may include: a front wheel (11) positioned on the front of the distance measurement unit (10) in a moving direction of the distance measurement unit (10), and a rear wheel (12) positioned in rear of the front wheel (11), and the flatness measurement unit (20) may include an angle measurement sensor (21).

The angle measurement sensor (21) may measure an inclined angle (c) formed by the front wheel (11) and the rear wheel (12).

The height adjustment unit (200) may include a rotating unit (210) configured to change an angle formed by the conveyor belt (110).

The flatness measurement unit (20) may generate the height information (b) including information (d) on the difference in height between the front wheel (11) and the rear wheel (12) according to the following formula 1 by using the inclined angle (c).

$$d(h1-h2)=\tan(c) \times L, \qquad \text{[Formula 1]}$$

where h1: the height of the front wheel (11) on a predetermined reference surface (S), h2: the height of the front wheel (12) on the predetermined reference surface (S), and L: the length between a center axis of the front wheel (11) and a center axis of the rear wheel (12).

The flatness measurement unit (20) may generate road surface shape information (f) by using the moving distance information (a) and the height information (b).

The road surface profiler performance measuring instrument may further include a constraint unit (400) configured to constrain a holding unit (30) mounted on the road surface profiler (A).

The constraint unit (400) may include: a first constraint unit (410) coupled to the holding unit (30); and a second constraint unit (420) coupled to the first constraint unit (400) and configured to fix a front surface (A1) and a rear surface (A2) of the road surface profiler (A).

The control unit (300) may control the travelling unit (100) and the height adjustment unit (200) by using test road surface shape information (g), and the control unit (300) may assess the performance of the road surface profiler (A) by comparing the test road surface shape information (g) with the road surface shape information (f).

In accordance with another embodiment of the present invention, a method for assessing the performance of a road surface profiler includes: a first step (S100) of inputting the test road surface shape information (g) to the control unit (300); a second step (S200) of deriving the road surface shape information (f) by using the travelling unit (100) and the height adjustment unit (200); and a third step (S300) of assessing the performance of the road surface profiler (A) by comparing the test road surface shape information (g) with the road surface shape information (f).

Advantageous Effects

In accordance with the present invention, the cross-sectional shape of a road surface may be accurately profiled.

In accordance with the present invention, the flatness of the road surface may be accurately measured.

In accordance with the present invention, the objective performance of the road surface may be measured.

MODE FOR CARRYING OUT THE INVENTION

Figure 1:
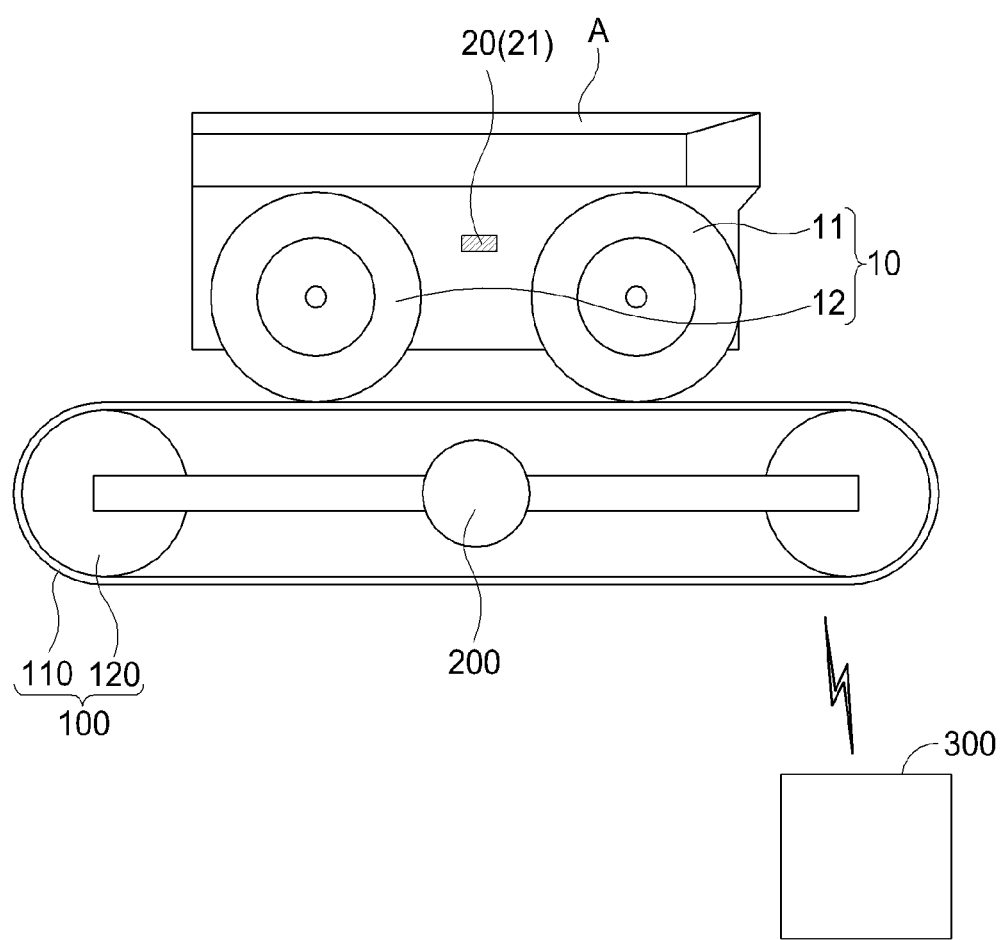
FIG. 1 is a conceptual diagram of a road surface profiler and a road surface profiler performance measuring instrument in accordance with an embodiment of the present invention.

Preferred embodiments of a road surface profiler, a road surface profiler performance measuring instrument, and a method for assessing the performance of a road surface profiler by using the same, according to the present invention, will be described below in detail with reference to the accompanying drawings. In describing the embodiments with reference to the accompanying drawings, the same or corresponding elements are denoted by the same reference numerals, and a duplicate description thereof will be omitted.

Further, the terms such as "first" and "second" are merely identifiers for distinguishing one element from other identical or corresponding elements, but the above elements shall not be restricted to the above terms.

Further, when one element is described to be "coupled" to another element, it does not refer to a physical, direct contact between these elements only, but it shall also include the possibility of yet another element being interposed between these elements and each of these elements being in contact with said yet another element.

The present invention provides a road surface profiler performance measuring instrument capable of measuring the objective performance of a road surface profiler, as well as a road surface profiler A.

First, a detailed configuration of the road surface profiler A will be described.

Figure 2:
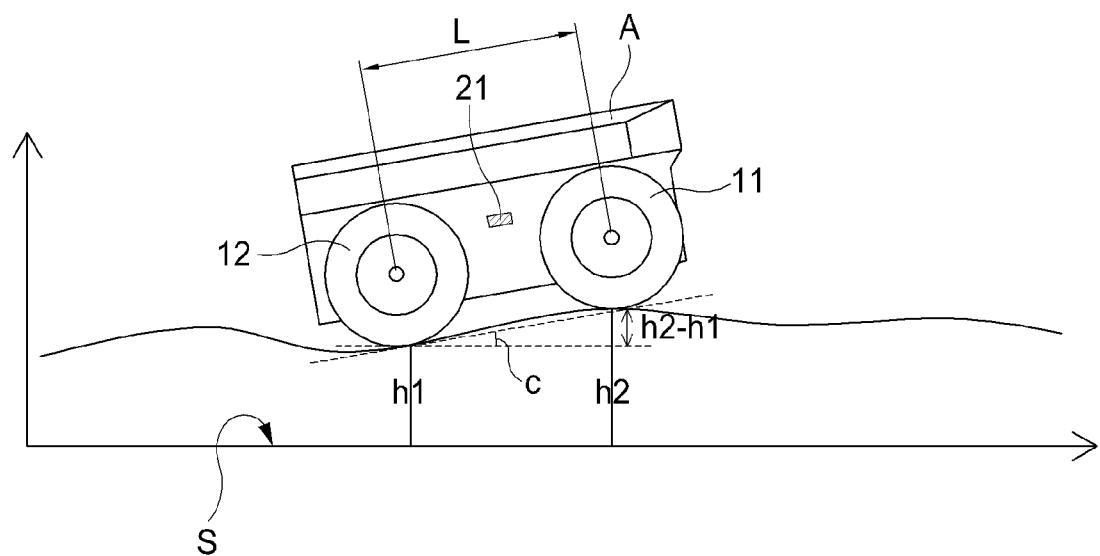
FIG. 2 is a conceptual diagram of the road surface profiler in accordance with an embodiment of the present invention.

The road surface profiler A, according to an embodiment of the present invention, includes a distance measurement unit 10 that measures a moving distance of the road surface profiler A and a flatness measurement unit 20 that measures the flatness of a road surface (FIG. 2).

The distance measurement unit 10 generates moving distance information a on a moving distance of the road surface profiler A. The distance measurement unit 10 may be a circular wheel 11 (FIG. 2). The circular wheel 11 may include a front wheel 11 positioned on the front thereof in a moving direction of the distance measurement unit 10 and a rear wheel 12 positioned in rear of the front wheel 11 (FIG. 2).

The flatness measurement unit 20 generates height information b at each point of the road surface. In detail, the flatness measurement unit 20 includes an angle measurement sensor 21 that measures an inclined angle c formed by the front wheel 11 and the rear wheel 12 (FIG. 2).

The flatness measurement unit 20 may generate the height information b that includes information d on the difference in height between the front wheel 11 and the rear wheel 12 according to the following formula 1 by using the inclined angle c.

$$d(h1-h2)=\tan(c)\times L, \qquad \text{[Formula 1]}$$

where h1: the height of the front wheel 11 on a predetermined reference surface S, h2: the height of the front wheel 12 on the predetermined reference surface S, and L: the length between a center axis of the front wheel 11 and a center axis of the rear wheel 12.

Figure 3:
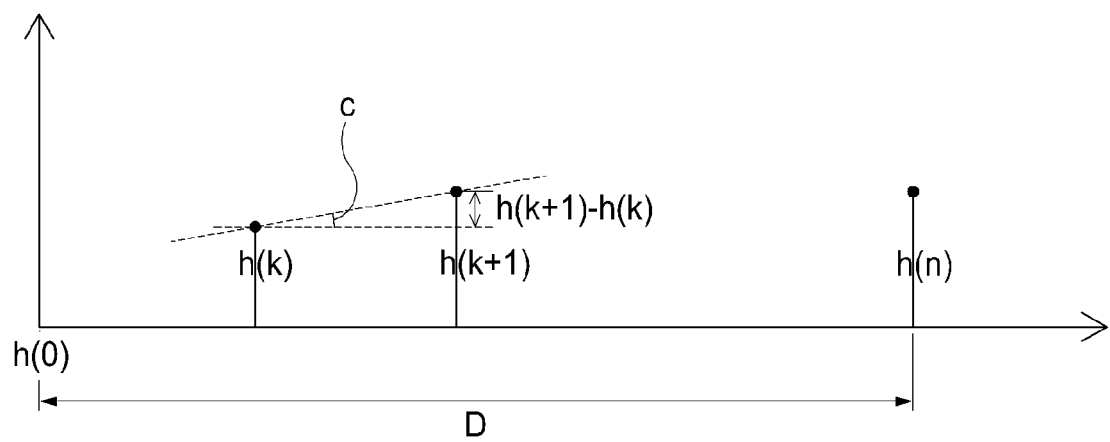
FIG. 3 is a view illustrating a concept of profiling the cross-sectional shape of a road surface by the road surface profiler in accordance with an embodiment of the present invention.

Further, the flatness measurement unit 20 may generate road surface shape information f by using the moving distance information a and the height information b (FIGS. 2 and 3).

Hereinafter, a detailed configuration of the road surface profiler performance measuring instrument in accordance with an embodiment of the present invention will be described.

The road surface profiler performance measuring instrument, according to the present invention, provides a virtual environment in which a road surface profile is simulated so as to assess the objective performance of the road surface profiler in a state in which an external factor of an actual road or a factor according to the ability of an operator are excluded.

Thus, the objective performance of different types of road surface profilers may be assessed in the same environment to evaluate whether the road surface profiler is normally operated and select one, having the best performance, among the road surface profilers.

Figure 4:
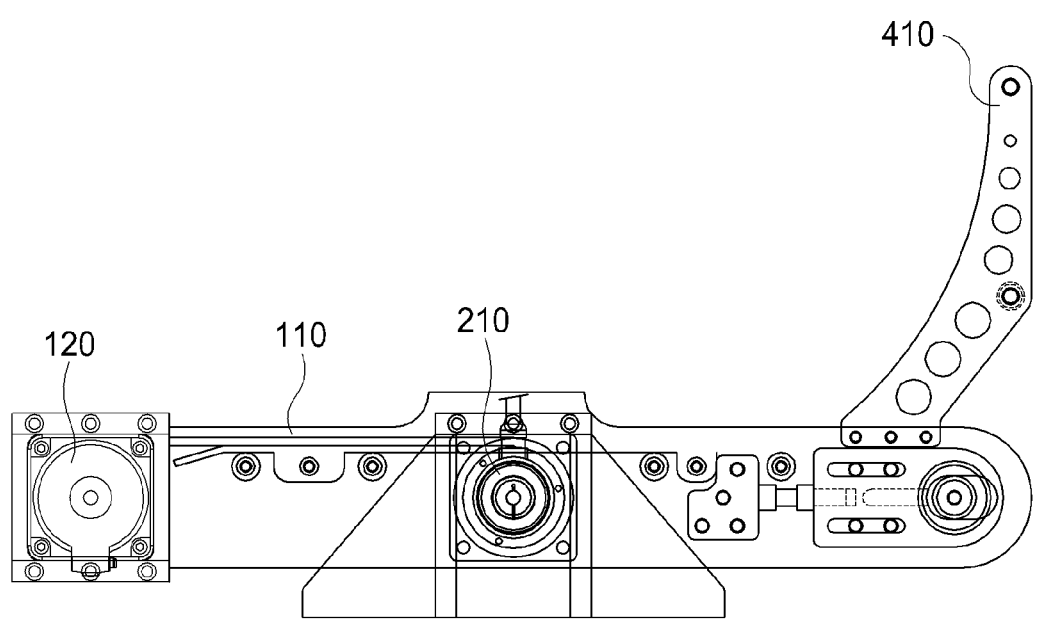
FIG. 4 is a diagram of the road surface profiler performance measuring instrument in accordance with an embodiment of the present invention.
Figure 5:
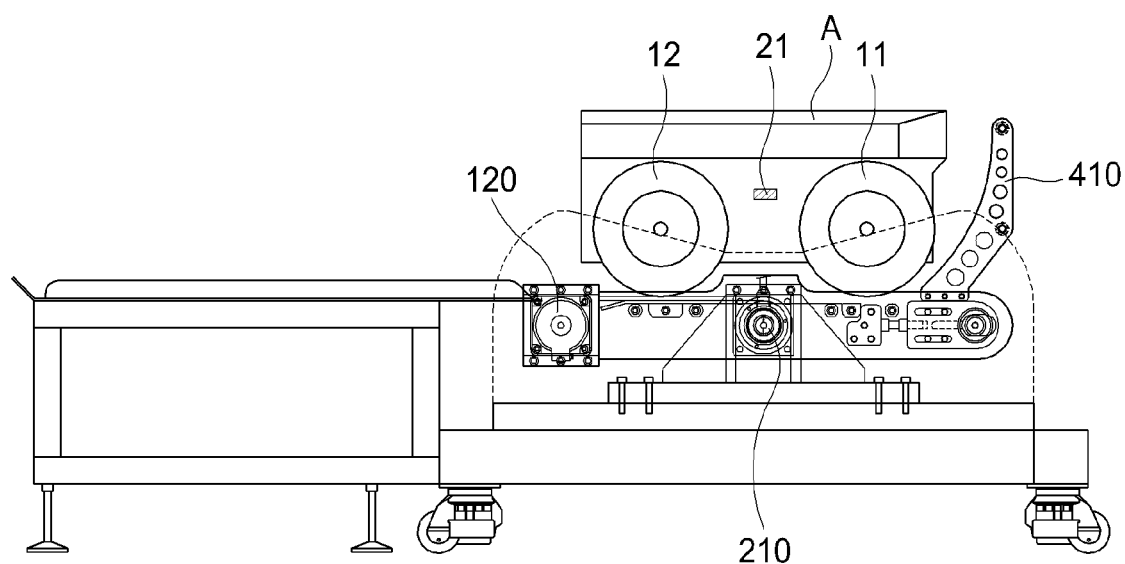
FIG. 5 is a view illustrating a method for coupling the road surface profiler to the road surface profiler performance measuring instrument in accordance with an embodiment of the present invention.

The road surface profiler performance measuring instrument includes a travelling unit 100 that increases the moving distance information a generated by the distance measurement unit 10 and a height adjustment unit 200 that changes the height information b generated by the flatness measurement unit 20 (FIGS. 1 and 4).

The travelling unit 100 may include a conveyor belt 110 on which the circular wheel is mounted and rotary drums 120 which each move the conveyor belt 110 (FIG. 4).

The rotary drum 120 may be driven by means of an electric motor 130 or the like that provides a rotational force.

The height adjustment unit 200 may include a rotating unit 210 that changes an angle formed by the conveyor belt 110 (FIGS. 1 and 4).

The rotating unit 210 may change the angle formed by the conveyor belt 110 by varying the positions of the rotary drums 120 provided on both ends of the conveyor belt 110. When the angle formed by the conveyor belt 110 is changed, a difference in height between the front wheel 11 and the rear wheel 12 occurs, and thus a state in which a height difference occurs on the actual road surface may be simulated.

A control unit 300 may simulate an actual road surface environment through the control of the travelling unit 100 and the height adjustment unit 200 using preset test road surface shape information g so as to compare the road surface shape information f, generated by the road surface profiler A, with the test road surface shape information g, thereby assessing the performance of the road surface profiler A.

The evaluation may be performed by an evaluator and may also be automatically carried out by the control unit 300.

The road surface profiler performance measuring instrument, according to an embodiment of the present invention, may further include a constraint unit 400 that constrains a holding unit 30 mounted on the road surface profiler A.

The road surface profiler A is operated on the conveyor belt 110 in a state in which various angles formed by the conveyor belt 110 are changed. Thus, the constraint unit 400 constrains the holding unit 30 so as to prevent the road surface profiler A from being separated from the conveyor belt 110.

Figure 6:
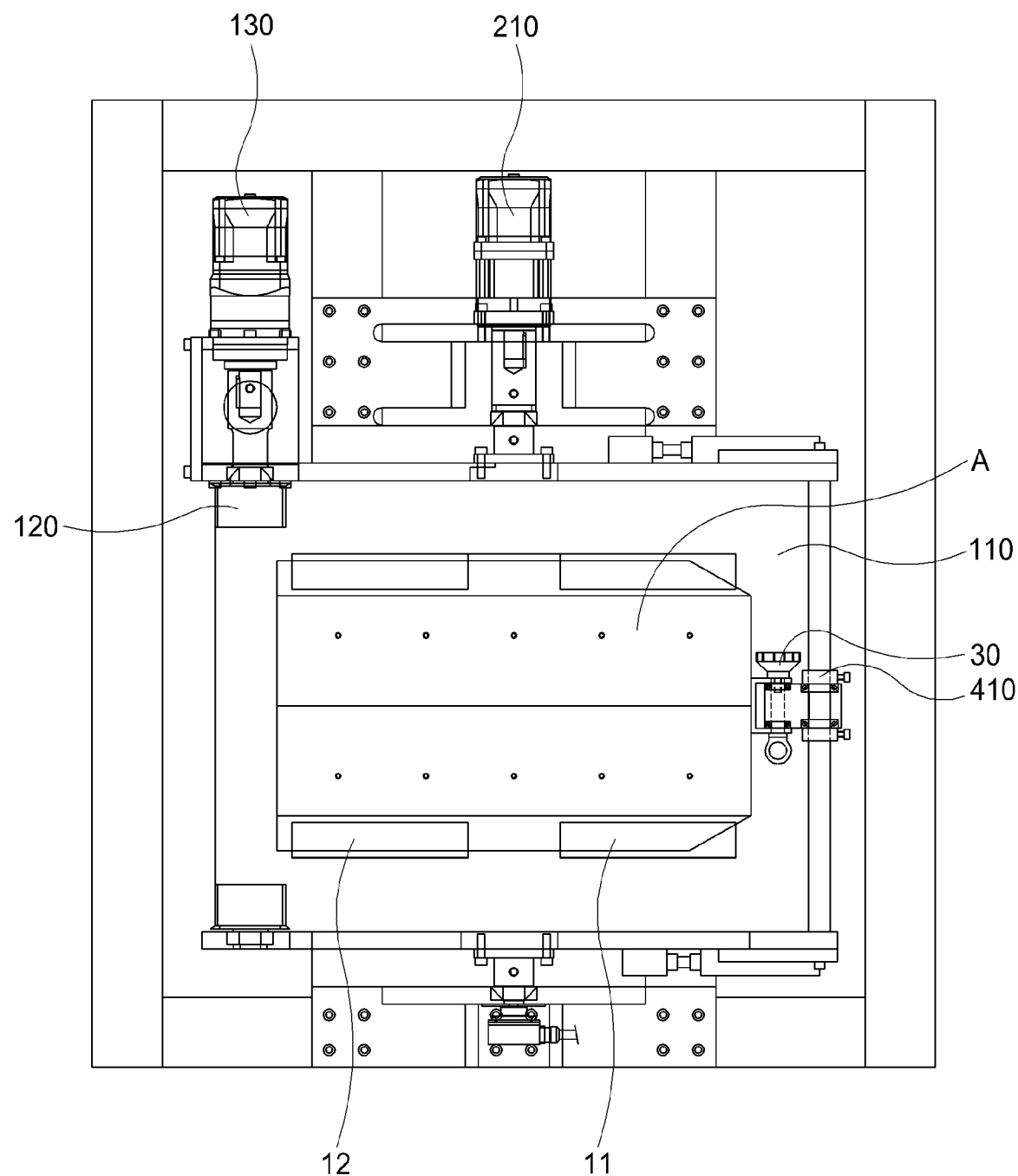
FIG. 6 is a plan view of the road surface profiler performance measuring instrument in accordance with an embodiment of the present invention.
Figure 7:
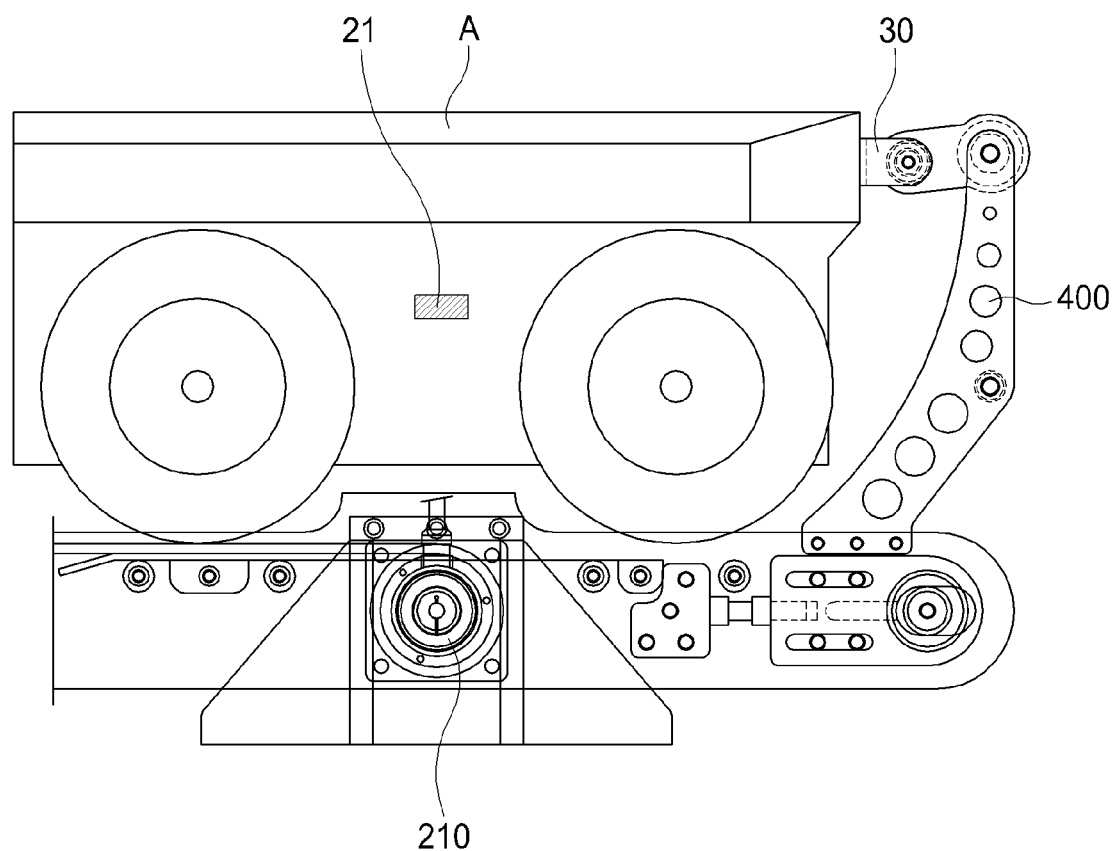
FIG. 7 is a view illustrating the coupled road surface profiler and road surface profiler performance measuring instrument in accordance with an embodiment of the present invention.
Figure 8:
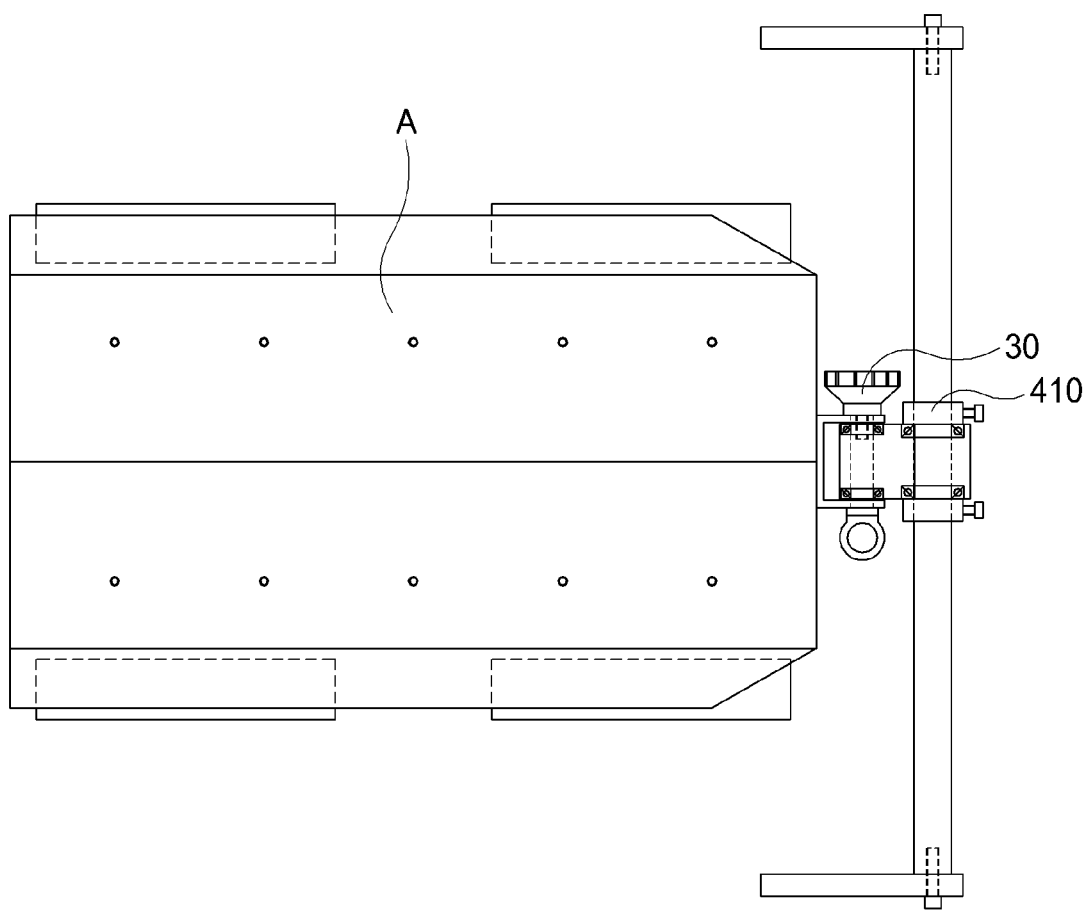
FIG. 8 is a plan view of the coupled road surface profiler and road surface profiler performance measuring instrument in accordance with an embodiment of the present invention.
Figure 9:
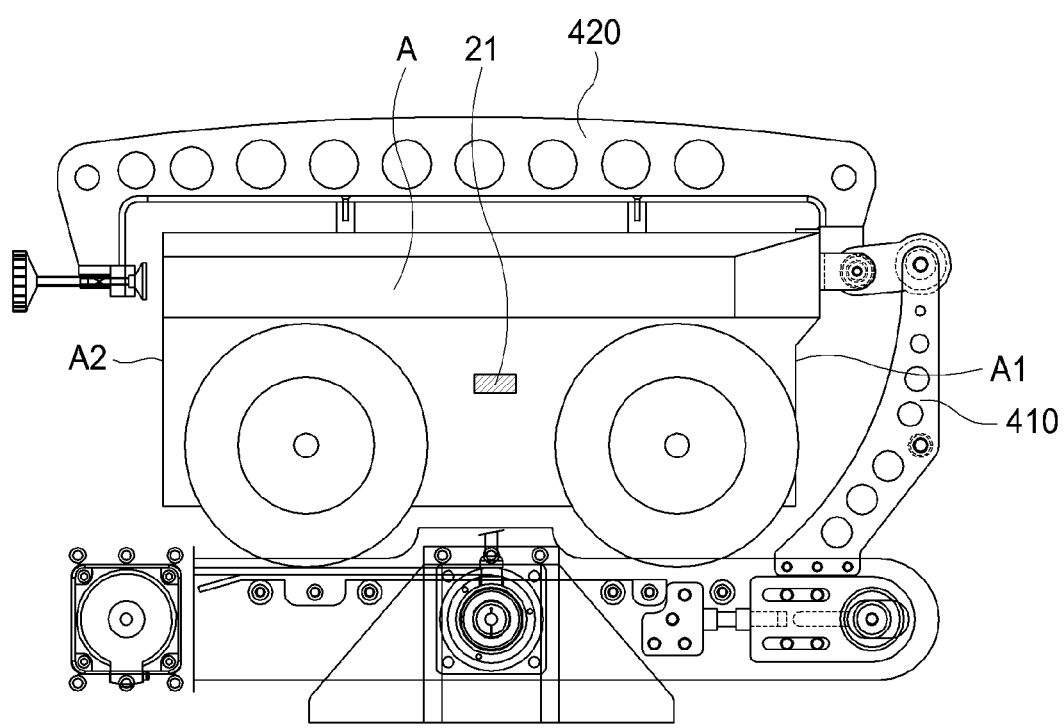
FIG. 9 is a view illustrating the road surface profiler constrained by a constraint unit of the road surface profiler performance measuring instrument in accordance with an embodiment of the present invention.

In detail, the constraint unit 400 may include a first constraint unit 410 that is coupled to the holding unit 30 and a second constraint unit 420 that is coupled to the first constraint unit 410 and fixes a front surface A1 and a rear surface A2 of the road surface profiler A (FIG. 6).

The length of the second constraint unit 420 may correspond to that of the road surface profiler A.

Further, an adjusting screw for making contact with the rear surface A2 may be included at a rear end of the second constraint unit 420.

A user may adjust the position of the adjusting screw, thereby allowing the second constraint unit 420 to strongly fix the road surface profiler A.

While a performance test is carried out by using the second constraint unit 420, the position of the road surface profiler A may be kept constant.

Hereinafter, a method for assessing the performance of a road surface profiler by using a road surface profiler performance measuring instrument, according to an embodiment of the present invention, will be described.

The method for assessing the performance of a road surface profiler may include: a first step (S100) of inputting the test road surface shape information g to the control unit 300; a second step (S200) of deriving the road surface shape information f by using the travelling unit 100 and the height adjustment unit 200; and a third step (S300) of assessing the performance of the road surface profiler A by comparing the test road surface shape information g with the road surface shape information f.

The moving distance information a, the height information b, the inclined angle c, the height difference information d, the road surface shape information f, and the test road surface shape information g, according to the present invention, may be displayed by a display unit.

Further, the road surface profiler performance measuring instrument, according to the present invention, may further include a storage unit that stores the moving distance information a, the height information b, the inclined angle c, the height difference information d, the road surface shape information f, and the test road surface shape information g and transmits, to the control unit 300, the stored moving distance information a, height information b, inclined angle c, height difference information d, road surface shape information f, and test road surface shape information g.

The foregoing is merely illustrative of some of exemplary embodiments that may be implemented by the present invention. As is well known, the scope of the present invention should not be construed as being limited to the above embodiments. In addition, it should be understood that the scope of the present invention may include both the technical idea of the present invention and the technical ideas sharing the basis thereof.

The invention claimed is:

1. A road surface profiler performance measuring instrument for implementing a virtual road condition to assess the performance of a road surface profiler (A) including a distance measurement unit (10) and a flatness measurement unit (20), the road surface profiler performance measuring instrument comprising:
a travelling unit (100) configured to increase moving distance information (a) generated by the distance measurement unit (10);
a height adjustment unit (200) configured to change height information (b) generated by the flatness measurement unit (20); and
a control unit (300) configured to control the travelling unit (100) and the height adjustment unit (200), wherein
the distance measurement unit (10) is a circular wheel (11), and the travelling unit (100) comprises: a conveyor belt (110) on which the circular wheel is mounted; and a rotary drum (120) configured to move the conveyor belt (110), the circular wheel (11) comprises: a front wheel (11) positioned on the front of the distance measurement unit (10) in a moving direction of the distance measurement unit (10); and a rear wheel (12) positioned in rear of the front wheel (11), and the flatness measurement unit (20) comprises an angle measurement sensor (21), the angle measurement sensor (21) measures an inclined angle (c) formed by the front wheel (11) and the rear wheel (12), and the height adjustment unit (200) comprises a rotating unit (210) configured to change an angle formed by the conveyor (110).

2. The road surface profiler performance measuring instrument of claim 1, wherein the flatness measurement unit (20) generates the height information (b) comprising information (d) on the difference in height between the front wheel (11) and the rear wheel (12) according to the following formula 1 by using the inclined angle (c), $$d(h1-h2)=\tan(c) \times L,  \quad \text{[Formula 1]}$$

where h1: the height of the front wheel (11) on a predetermined reference surface (S), h2: the height of the front wheel (12) on the predetermined reference surface (S), and L: the length between a center axis of the front wheel (11) and a center axis of the rear wheel (12).

3. The road surface profiler performance measuring instrument of claim 2, wherein the flatness measurement unit (20) generates road surface shape information (f) by using the moving distance information (a) and the height information (b).

4. The road surface profiler performance measuring instrument of claim 3, further comprising a constraint unit (400) configured to constrain a holding unit (30) mounted on the road surface profiler (A).

5. The road surface profiler performance measuring instrument of claim 4, wherein the constraint unit (400) comprises: a first constraint unit (410) coupled to the holding unit (30); and a second constraint unit (420) coupled to the first constraint unit (400) and configured to fix a front surface (A1) and a rear surface (A2) of the road surface profiler A.

6. A method for assessing the performance of a road surface profiler by using the road surface profiler performance measuring instrument of claim 5, the method comprising:

a first step (S100) of inputting the test road surface shape information (g) to the control unit (300);

a second step (S200) of deriving the road surface shape information (f) by using the travelling unit (100) and the height adjustment unit (200); and a third step (S300) of assessing the performance of the road surface profiler (A) by comparing the test road surface shape information (g) with the road surface shape information (f).

7. The road surface profiler performance measuring instrument of claim 4, wherein the control unit 300 controls the travelling unit (100) and the height adjustment unit (200) by using test road surface shape information (g), and the control unit (300) assesses the performance of the road surface profiler (A) by comparing the test road surface shape information (g) with the road surface shape information (f).

* * * * *